United States Patent [19]

Schuster et al.

[11] Patent Number: 5,012,253
[45] Date of Patent: Apr. 30, 1991

[54] RADAR RECEIVER

[75] Inventors: Manfred Schuster, Eckental; Harald Wich, Rothenbach, both of Fed. Rep. of Germany

[73] Assignee: Diehl GmbH & Co., Fed. Rep. of Germany

[21] Appl. No.: 420,956

[22] Filed: Oct. 13, 1989

[30] Foreign Application Priority Data

Nov. 3, 1988 [DE] Fed. Rep. of Germany ....... 3837348

[51] Int. Cl.⁵ .............................................. G01S 13/32
[52] U.S. Cl. ..................................... 342/203; 342/101; 342/200
[58] Field of Search ............... 342/203, 200, 198, 101, 342/122, 89; 455/311; 328/167

[56] References Cited

U.S. PATENT DOCUMENTS

| | | | |
|---|---|---|---|
| Re. 29,401 | 9/1977 | Aker et al. ........................ | 342/115 |
| Re. 33,055 | 9/1989 | Labbé et al. ...................... | 342/99 |
| 2,462,859 | 3/1949 | Grieg ................................. | 342/203 |
| 2,466,959 | 4/1949 | Moore .............................. | 342/203 X |
| 2,936,451 | 5/1960 | Miller ............................... | 342/203 |
| 3,599,207 | 8/1971 | Foiani et al. ..................... | 342/52 |
| 3,603,988 | 9/1971 | Johnson ........................... | 342/203 X |
| 3,721,978 | 3/1973 | Doggett, Jr. ..................... | 342/101 |
| 3,761,946 | 9/1973 | Johannessen et al. ........... | 342/101 |
| 3,836,966 | 9/1974 | Frisbee, Jr. ...................... | 342/91 |
| 3,891,169 | 6/1975 | Tremarco ......................... | 248/554 |
| 4,005,420 | 1/1977 | McDonald ....................... | 342/84 |
| 4,131,889 | 12/1978 | Gray ................................. | 342/114 |
| 4,135,189 | 1/1979 | Josse ................................. | 342/18 |
| 4,242,663 | 12/1980 | Slobodin ......................... | 340/152 T |
| 4,347,515 | 8/1982 | Hoover, Jr. ...................... | 342/351 |
| 4,430,654 | 2/1984 | Küpfer ............................. | 342/159 |
| 4,511,897 | 4/1985 | Lindner ........................... | 342/351 |
| 4,733,239 | 3/1988 | Schmitt ............................ | 342/94 |
| 4,780,719 | 10/1988 | Frei et al. ......................... | 342/53 |
| 4,782,344 | 11/1988 | Ledinh et al. .................... | 342/351 |
| 4,783,660 | 11/1988 | Pierce .............................. | 342/101 |
| 4,804,962 | 2/1989 | Picquendar ..................... | 342/159 |

FOREIGN PATENT DOCUMENTS 3113472 10/1982 Fed. Rep. of Germany .

OTHER PUBLICATIONS

Millman, "Microelectronics–Digital and Analog Circuit Systems," McGraw-Hill Book Co., 1979, pp. 584–592.
Introduction to Radar Systems by M. I. Skolnik (Chapter 1.2).
Halbleiter-Schaltungstechnik, by U. Tietze and Ch. Schenk, 5th Edition, pp. 206 and 207.

Primary Examiner—Thomas H. Tarcza
Assistant Examiner—John B. Sotomayor
Attorney, Agent, or Firm—Scully, Scott, Murphy & Presser

[57] ABSTRACT

A radar receiver and, more particularly, a radar receiver of the type which is utilized in connection with a frequency-modulated, continuous-signal radar apparatus. The radar receiver, in the receiving channel thereof, is provided with a high-pass filter of the second order which is only operated in the linear characteristic curves range, thus acting as an $R^4$-filter and which is connected in front of a demodulating rectifier, or in essence, an analog-digital quantisizer.

4 Claims, 1 Drawing Sheet

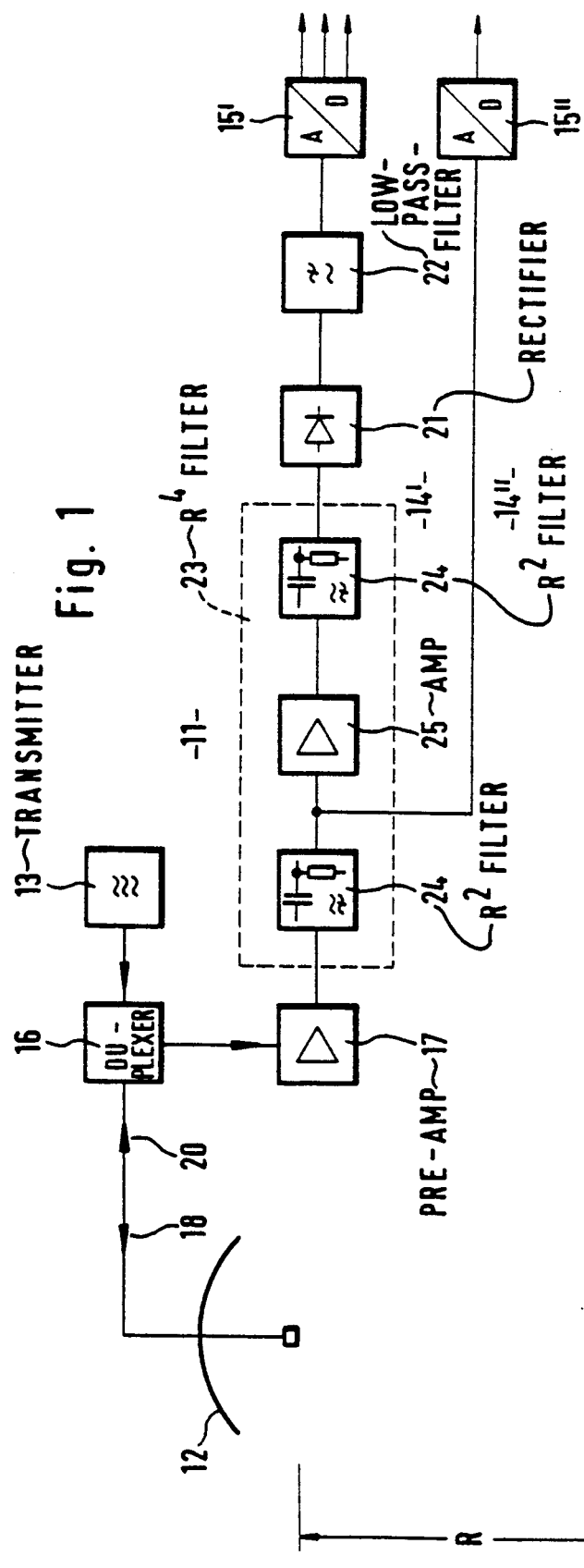

RADAR RECEIVER

BACKGROUND OF THE INVENTION

1. Field of the Invention

The present invention relates to a radar receiver and, more particularly, relates to a radar receiver of the type which is utilized in connection with a frequency-modulated, continuous-signal radar apparatus.

2. Discussion of the Prior Art

A radar receiver of the type which is considered herein is, in general, known from the disclosure of German Laid-Open Patent Appln. 31 13 472.

Furthermore, from the standard reference publication "Introduction to Radar Systems" by M. I. Skolnik, (Chapter 1.2), it is known that the power of a receiving signal which is returned upon being reflected from a pin-point target is inversely proportional to the fourth-power of the distance between the transmitting-receiving antenna and the pin-point target. Resulting therefrom is an extremely extensive dynamic range of the receiving signal in dependence upon variations in the distance of the radar relative to the pin-point target. This dynamic range cannot as a rule be controlled with a single demodulating-rectifier, inasmuch as either low input signals are at a level which is below the threshold of the characteristic curves, or high input signals will modulate the rectifier into the range of emission saturation, in essence, in both instances the fluctuations in the input will not lead to a representative output signal which would be suitable for digitalizing so as to enable a subsequent signal analysis. The conceivable alternative to respectively employing a rectifier or demodulator for low to average and for average to high excitations connected in parallel, is extremely complex from the standpoint of the circuitry technology, and is especially critical in the matching of characteristic curves during transition from low to high levels of excitations.

It is possible to conceive reducing the receiving signal dynamics through the installation of a compandor in the receiving channel; in effect, generally such as through the utilization of a logarithmic amplifier; for example, as is disclosed in U. Tietze and Ch. Schenk "Halbleiter-Schaltungstechnik" 5th Edition, pages 206 and 207, or through the effectuation of a characteristics curve for a compandor by means of a diode-series circuit. A frequency-dependently operating logarithmic amplifier; however, is extremely complicated from the circuitry technology. The implementation of a compandor characteristics curve from actual diode characteristic curves leads to design problems because of the non-linear (modulating) effects, with the requirement, that the higher harmonics resulting therefrom, must prior to the further processing, again be separately filtered out. Above all; however, it has been evidenced that the installation of such compandor circuits will deteriorate the antenna properties of the radar antenna inasmuch as the attenuation of secondary peaks becomes considerably lessened and, moreover, will adversely influence the unidirectional action of the radar antenna, inasmuch as the width of the main lobe is quite intensively increased; both of which is undesirable in the interest of obtaining a clear detection of a pin-point target in a clutter environment.

SUMMARY OF THE INVENTION

In recognition of these conditions, the invention has as its primary object the reduction of the dynamic range in the radar-receiving channel of a frequency-modulated continuous-signal radar, without thereby essentially adversely influencing the unidirectional characteristics of the radar antenna or also necessitating the installation of more extensive circuitry for the compensation of undesired non-linear effects.

The foregoing object is inventively attained in that the radar receiver, in the receiving channel thereof, is provided with a high-pass filter of the second order as an $R^4$-filter which is only modulated in the linear characteristic curves range, and which is connected in front of a demodulating rectifier, or in essence, an analog-digital quantisizer.

In accordance with the foregoing, there is eliminated the R-exponent-four ($R^4$) dependence of the receiving signal on the distance between the antenna and the pin-point target, in that two filters with quadratic power characteristics in the operating range over the frequency are interposed in the receiving channel in front of the demodulating rectifier; in effect, before the analog-digital quantisizing. Such an R-quadratic ($R^2$) filter is particularly simply implementable as the circuit of a high-pass filter of the first order which is only modulated in the linear beginning region of its characteristics curve such that the output amplitude will linearly depend upon the input amplitude over the signal frequency, which corresponds to a quadratic dependence of the (of significance to the radar equations) powers or strengths of the receiving signal over the receiving frequency.

The implementation in a series-connection of two simple high-pass filters of the first order provides for the additional advantage that without requiring any additional demands, it is possible to facilitate a simple compression in the dynamic range of also the receiving signals which can be traced back to the clutter power, in that a clutter channel is branched off between both R-quadratic filters for radar frequency evaluation. Consequently, there is compensated (linearized) the R-quadratic dependency which is present in the clutter channel, which is given in that, at a generally right-angled detection of a large-surfaced clutter-target are, the power of the receiving signal is in a close approximation inversely proportional to the square of the distance between the radar transmitting-receiving antenna and the clutter-target area (refer to M. I. Skolnick supra, Chap. 13.2, Equation 13.9).

BRIEF DESCRIPTION OF THE DRAWINGS

Additional alternatives and modifications, as well as further features and advantages of the invention, may now be readily ascertained from the following detailed description of an exemplary embodiment thereof, taken in conjunction with the accompanying generally diagrammatically represented unipolar block circuit diagram; in which:

FIG. 1 illustrates two radar receiving channels which are cleared of dependencies on distance; and FIG. 2 illustrates the modulating region of a high-pass filter comprising an $R^2$-filter

DETAILED DESCRIPTION

A radar apparatus 11 essentially possesses a transmitter 13 which supplies or feeds an antenna 12, and at least one receiving channel 14 which supplies a quantisizer 15 for the conversion of the analog radar-receiving information into an encoded digital information. Ordinarily, the transmitter 13 and the receiving channel 14 are connected through a duplexer 16 to a common transmitting-receiving antenna 12. A preamplifier 17 which is connected to the input of the receiver supplies the receiving channel 14 with an amplitude-and-frequency information in accordance with the measure of the energy which is irradiated by the transmitter 13 and reflected at some distance in front of the antenna 12.

As is known from the radar equations, the reflection of the transmitting energy from a pin-point target 19 delivers a receiving signal 20 at a signal power which is inversely proportion to the fourth-power of the distance R between the antenna 12 and the pin-point target 19. From this, there results a considerable fluctuation in the energy content (in effect, in the amplitude) of the receiving signal 20 in dependence upon the distance R to the target. When, in a radar-modulus receiving channel 14', there is demodulated the receiving signal 20 by means of a rectifier 21 for the recovery of the signature of a pin-point target 19, and if necessary smoothed in a subsequent low-pass filter 22, there then results from the high-amplitude dynamics of the receiving signal 20 which emanates from the pin-point target 19, that the demodulation will lead to large errors. Then there is either employed a rectifier 21 whose characteristics curve will allow for the modulation with a high amplitude; however, whereby such a rectifier will not deliver an output signal because of a correspondingly high threshold voltage at modulation at low amplitudes. On the other hand, there can be installed a rectifier with a low threshold voltage, in order to also be able to demodulate low-amplitude fluctuations in the receiving signal 20; with the consequence, that this rectifier is over-controlled at high input amplitudes into the characteristics curve saturation; in essence, different amplitudes heights can no longer be distinguished from each other at the output.

For an analog-digital conversion in a quantisizer 15, large fluctuations in the level of the receiving signal 20 possess the disadvantage that at an adequate resolution of also lower amplitude fluctuations, for the entire amplitude height will require at the output the utilization of a large bit width, in essence, an expensive and relatively slowly operating transducer, and complex intersecting circuits for the processing of their large number of output channels.

This problem in the high amplitude rise of the receiving signal 20 due to its dependence upon distance to the fourth-power, can, however, be controlled in that the amplitude information of the receiving signal 20 which is to be rectified or quantisized can be compensated for by the installation of an R-fourth-power filter; namely, is brought into an inverse dependence upon the distance R to the pin-point target 19. A filter 23 of this kind can be expediently produced from the series-circuit of two R-quadratic filters 24 between which, when required, there is interconnected a matching amplifier 25. It is possible to illustrate that every R-quadratic filter 24 is to be electrically designed as a linear high-pass filter, which is especially simply implementable as an R-C high-pass filter of the first order, which is modulated only in its linear range; in effect, in the initial region of its characteristics curve (FIG. 2) and thereby widely below the threshold frequency fg, in a range up to a maximum frequency fm. These $R^2$-filters 24 can be designed as passive R-C filters or as active filters in view of providing applicable circuitry in amplifiers 17, 25 which are in any event already present in the receiving channel 14.

An embodiment of the R-fourth-power filter 23 as a series circuit formed from two $R^2$-filters 24, beyond the unproblematic implementability as high-pass filters of the first order, also possesses the advantage that a further receiving channel 14" can be branched off between the two high-pass filters 24 for the supplying of a further quantisizer 15". The output signal of the latter provides a linear information with regard to the power of reflected transmitting energy 18 in the target-surrounding clutter 26. The foregoing relates to almost vertical reflections at the terrain surface in the surrounding of the pin-point target 19 whose receiving power, in a close approximation, is inversely proportional to the square of the antenna-clutter distance R. Through the branching off of a clutter-receiving channel 14" between the two filters 24, the clutter amplitude is thusly maintained constant over the distance R, in order to be able to attain a frequency-dependent digitalized output information which is characteristic for the clutter conditions, without any need to design the quantisizer 15" for extreme input fluctuations.

What is claimed is:

1. A radar receiver having a receiving channel; comprising a high pass filter of the second order which is operated only in a linear characteristics curve range so as to act as an $R^4$-filter, said filter comprising a series circuit of two $R^2$-filters, with each $R^2$-filter including a high pass filter of the first order, and wherein a clutter receiving channel is coupled to and branched off intermediate said two $R^2$-filters and the output of said high pass filter of the second order being coupled to a demodulating rectifier.

2. A radar receiver as claimed in claim 1, wherein the output said high pass filter of the second order is coupled to an analog-digital quantisizer.

3. A radar receiver as claimed in claim 2, wherein each said $R^2$-filter comprises an R-C high pass filter.

4. A radar receiver as claimed in claim 1, wherein each said $R^2$-filter comprises an R-C high pass filter.

* * * * *